US007397028B2

(12) United States Patent
Brennen et al.

(10) Patent No.: US 7,397,028 B2
(45) Date of Patent: Jul. 8, 2008

(54) APPARATUS AND METHOD FOR GAS FLOW MANAGEMENT

(75) Inventors: Reid A. Brennen, San Francisco, CA (US); Tom A van de Goor, San Mateo, CA (US); Gangqiang Li, Palo Alto, CA (US); Kevin P. Killeen, Woodside, CA (US)

(73) Assignee: Agilent Technologies, Inc., Santa Clara, CA (US)

( * ) Notice: Subject to any disclaimer, the term of this patent is extended or adjusted under 35 U.S.C. 154(b) by 182 days.

(21) Appl. No.: 11/216,884

(22) Filed: Aug. 30, 2005

(65) Prior Publication Data

US 2007/0045532 A1 Mar. 1, 2007

(51) Int. Cl.
*B01D 59/44* (2006.01)

(52) U.S. Cl. ....................... 250/288; 250/282; 250/281; 250/283

(58) Field of Classification Search .......... 250/281-300
See application file for complete search history.

(56) References Cited

U.S. PATENT DOCUMENTS 6,683,300 B2 * 1/2004 Doroshenko et al. ........ 250/288
6,825,462 B2 11/2004 Truche et al.
2002/0113207 A1 * 8/2002 Lee et al. .................... 250/288
2003/0146377 A1 * 8/2003 Miller et al. ................ 250/286
2003/0150984 A1 * 8/2003 Guevremont et al. ....... 250/281
2003/0155505 A1 * 8/2003 Russ et al. .................. 250/288
2005/0161596 A1 * 7/2005 Guevremont et al. ....... 250/294
2005/0178962 A1 * 8/2005 Guevremont et al. ....... 250/293

* cited by examiner

*Primary Examiner*—Jack I. Berman
*Assistant Examiner*—Andrew Smyth

(57) ABSTRACT

The invention described herein provides a mass spectrometry system, having an ion source including an ionization device for producing ions, a collection conduit adjacent to the ionization device for collecting ions produced by the ionization device, a first gas source for supplying gas to desolvate ions produced by the ionization device, a second gas source for supplying gas at a defined flow to the ionization region, and a detector downstream from the ion source for detecting ions produced by the ion source. The invention also provides an ion source including an ionization device for producing ions, a collection conduit adjacent to the ionization device for collecting ions produced by the ionization device, a first gas source for supplying gas to desolvate ions produced by the ionization device, and a second gas source for supplying gas at a defined flow to the ionization region. A method for producing analyte ions is also disclosed. The method includes producing analyte ions from an ionization device, directing a first heated gas toward the analyte ions to desolvate the analyte ions, and directing a second gas toward the analyte ions at a defined and continual flow rate.

25 Claims, 2 Drawing Sheets

APPARATUS AND METHOD FOR GAS FLOW MANAGEMENT

BACKGROUND

Mass spectrometers work by ionizing molecules and then sorting and identifying the molecules based on their mass-to-charge (m/z) ratios. Several different types of ion sources are available for mass spectrometry systems. Each different ion source has particular advantages and disadvantages for different types of molecules to be analyzed.

Much of the advancement in liquid chromatography (LC/MS) over the last ten years has been in the development of ion sources. The introduction of techniques that are performed at atmospheric pressure have been of particular interest. These techniques do not require the use of complex pumps and pumping techniques to create a vacuum. Common techniques include and are not limited to electrospray ionization (ESI), atmospheric pressure chemical ionization (APCI), and atmospheric pressure photoionization (APPI). Other more recent techniques include matrix assisted laser desorption ionization (MALDI) and atmospheric matrix assisted laser desorption ionization (AP-MALDI).

ESI is the oldest and most studied of the above-mentioned techniques. Electrospray ionization works by a technique that relies in part on chemistry of the molecules to generate analyte ions in solution before the analyte reaches the mass spectrometer. The liquid eluent is sprayed into a chamber at atmospheric pressure. The analyte ions are then spatially and electrostatically separated from neutral molecules. More recently, there has been a trend toward developing ESI ion sources that provide increased sensitivity, mass accuracy and signal stability.

Currently, the drying gas used in an ambient pressure ESI spray chamber is used for desolvating electrospray droplets. The drying gas then typically re-circulates in the chamber until it either exits the chamber via an opening or an exhaust port. Present systems suffer from the limitation of recirculation into the chamber, contamination by circulating species or sample residue. In particular, these contaminants can also impact signal strength which effects the quality of the final spectra obtained. For instance, signal strength can be reduced through poor ionization, poor efficiency in gathering the ions in the mass spectrometer and many other ways. In addition, a significant problem concerns the ability to maintain overall signal stabilities. Current methods and instrument designs provide a drying gas that enters the ionization chamber with a high velocity. The high gas velocity in many cases is needed to obtain the desired level of drying. However, this also negatively impacts spectra, spectra stability and overall instrument sensitivity. These and other problems have been overcome by the present invention.

SUMMARY OF THE INVENTION

The present invention relates to an apparatus and method for use with a mass spectrometry system. The invention provides a mass spectrometry system, comprising an ion source comprising an ionization device for producing ions, a collection conduit adjacent to the ionization device for collecting ions produced by the ionization device, a first gas source for supplying gas to desolvate ions produced by the ionization device and a second gas source disposed in the ion source for supplying a second gas at a defined, regulated flow rate to the ionization region; and a detector downstream from the ion source for detecting ions produced by the ion source.

The invention also provides an ion source comprising an ionization device for producing ions, a collection conduit adjacent to the ionization device for collecting ions produced by the ionization device, a first gas source for supplying gas to desolvate ions produced by the ionization device and a second gas source disposed in the ion source for supplying a second gas at a defined, regulated flow rate to the ionization region.

The method of the present invention comprises producing analyte ions from an ionization device, directing a first heated gas toward the analyte ions to desolvate the analyte ions, and directing a second gas toward the analyte ions at a defined and continual flow rate to improve the signal to noise ratio of the mass spectrometry system.

BRIEF DESCRIPTION OF THE FIGURES

The invention is described in detail below with reference to the following figures.

DETAILED DESCRIPTION OF THE INVENTION

Figure 1:
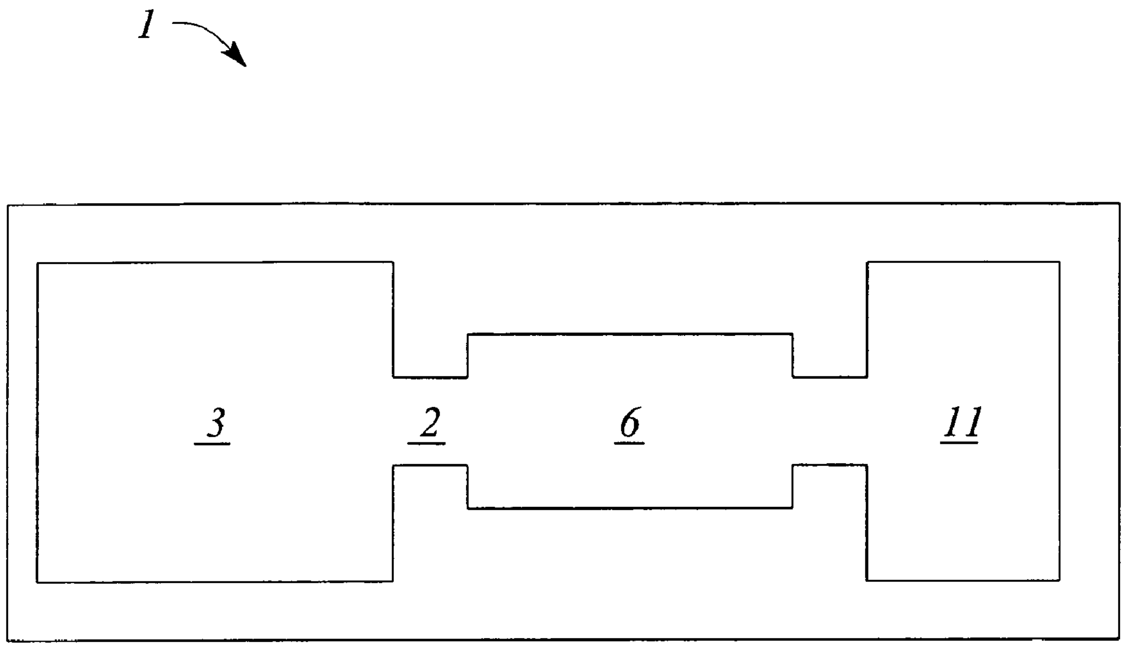
FIG. 1 shows general block diagram of a mass spectrometer.

Before describing the invention in detail, it must be noted that, as used in this specification and the appended claims, the singular forms "a," "an," and "the" include plural referents unless the context clearly dictates otherwise. Thus, for example, reference to "a conduit" includes more than one "conduit". Reference to a "matrix" includes more than one "matrix" or a mixture of "matrixes". In describing and claiming the present invention, the following terminology will be used in accordance with the definitions set out below.

The term "adjacent" means, near, next to or adjoining. Something adjacent may also be in contact with another component, surround the other component, be spaced from the other component or contain a portion of the other component. For instance, a capillary that is adjacent to a conduit may be spaced next to the conduit, may contact the conduit, may surround or be surrounded by the conduit, may contain the conduit or be contained by the conduit, may adjoin the conduit or may be near the conduit.

The term "conduit" or "collection conduit" refers to any sleeve, transport device, dispenser, nozzle, hose, pipe, plate, pipette, port, connector, tube, coupling, container, housing, structure or apparatus that may be used to receive a gas. In particular, a "collection conduit" may be designed to enclose a capillary or portion of a capillary that receives analyte ions from an ion source. The term should be interpreted broadly, however, to also include any device, or apparatus that may be oriented toward the ionization region and which can receive ions.

The term "first gas source" refers to any source, structure, design, conduit, or apparatus that provides a gas to an ionization region.

The term "second gas source" refers to any source, structure, design, conduit, or apparatus that provides gas at a defined and regulated flow rate to an ionization region.

The term "enhance" refers to any external physical stimulus such as heat, energy, light, or temperature change, etc. that makes a substance more easily characterized or identified. For example, a heated gas may be applied by a first gas source to "enhance" ions. The ions increase their kinetic energy, potentials or motions and are declustered or vaporized. Ions in this state are more easily detected by a mass analyzer. It should be noted that when the ions are "enhanced", the number of ions detected is enhanced since a higher number of analyte ions are sampled through a collection conduit and carried to a mass analyzer or detector.

The term "ion source" or "source" refers to any source that produces analyte ions. Ion sources may include other sources besides AP-MALDI ion sources such as electron impact (herein after referred to as EI), chemical ionization (CI) and other ion sources known in the art. An ion source described herein may have an ambient pressure (i.e., a temperature within the housing of the ion source) of below 100 mTorr or at least 100 mTorr. In certain embodiments an ion source may have an ambient pressure that is atmospheric pressure (approximately 760 Torr), or high vacuum pressure, for example.

The term "ionization device" refers to any device, apparatus, nebulizer or conduit that may be employed to produce ions. The ions produced may typically comprise an analyte in a solvent.

The term "ionization region" refers to the area between the ionization device and the collection conduit. In particular, the term refers to the analyte ions produced by the ion source that reside in that region and which have not yet been channeled into the collection conduit.

The terms "matrix based", or "matrix based ion source" refers to an ion source or mass spectrometry system that does not require the use of a drying gas, curtain gas, or a desolvation step. For instance, some systems require the use of such gases to remove solvent or cosolvent that is mixed with the analyte. These systems often use volatile liquids to help form smaller droplets. The above term applies to both nonvolatile liquids and solid materials in which the sample is dissolved. The term includes the use of a cosolvent. Cosolvents may be volatile or nonvolatile, but must not render the final matrix material capable of evaporating in vacuum. Such materials would include, and not be limited to m-nitrobenzyl alcohol (NBA), glycerol, triethanolamine (TEA), 2,4-dipentylphenol,1,5-dithiothrietol/dierythritol (magic bullet), 2-nitrophenyl octyl ether (NPOE), thioglycerol, nicotinic acid, cinnamic acid, 2,5-dihydroxy benzoic acid (DHB), 3,5-dimethoxy-4-hydroxycinnamic acid (sinpinic acid), a-cyano-4-hydroxycinnamic acid (CCA), 3-methoxy-4-hydroxycinnamic acid (ferulic acid), monothioglycerol, carbowax, 2-(4-hydroxyphenylazo)benzoic acid (HABA), 3,4-dihydroxycinnamic acid (caffeic acid), 2-amino-4-methyl-5-nitropyridine with their cosolvents and derivatives. In particular the term refers to MALDI, AP-MALDI, fast atom/ion bombardment (FAB) and other similar systems that do not require a volatile solvent and may be operated above, at, and below atmospheric pressure.

The term "gas flow", "gas", or "directed gas" refers to any gas that is directed in a defined direction in a mass spectrometry system. The term should be construed broadly to include monatomic, diatomic, triatomic and polyatomic molecules that can be passed or be blown through a conduit. The term should also be construed broadly to include mixtures, impure mixtures, or contaminants. The term includes both inert and non-inert matter. Common gases used with the present invention could include and not be limited to ammonia, carbon dioxide, helium, fluorine, argon, xenon, nitrogen, air etc.

The term "gas source" refers to any apparatus, machine, conduit, or device that produces a desired gas or gas flow. Gas sources often produce regulated gas flow, but this is not required.

The term "detector" refers to any device, apparatus, machine, component, or system that can detect an ion. Detectors may or may not include hardware and software. In a mass spectrometry system the common detector includes and/or is coupled to a mass analyzer.

A "plurality" is at least 2, e.g., 2, 3, 4, 6, 8, 10, 12 or greater than 12. The phrases "a plurality of" and "multiple" are used interchangeably.

The invention is described with reference to the figures. The figures are not to scale, and in particular, certain dimensions may be exaggerated for clarity of presentation.

FIG. 1 shows a general block diagram of a mass spectrometry system 1 of the present invention. The block diagram is not to scale and is drawn in a general format because the present invention may be used with a variety of different types of mass spectrometry systems. The mass spectrometry system 1 of the present invention comprises an ion source 3, an ion enhancement system 2, an ion transport system 6 and a detector 11. The ion enhancement system 2 may be interposed between the ion source 3 and the ion detector 11 or may comprise part of the ion source 3 and/or part of the ion transport system 6.

The ion source 3 may be located in any number of positions or locations. In addition, a variety of ion sources may be used with the present invention. For instance, El, Cl, MALDI, AP-MALDI, photo ionization or other ion sources well known in the art may be used with the invention. Other sources known in the art may be employed that provide for ions or spraying of ions. Typically, the ion source 3 may comprise an ionization device 8 that will be used to produce ions used or employed by the present invention. The ionization device 8 may comprise any number of devices in any number of designs and locations.

The ion enhancement system 2 may comprise a first gas source 7. Further details of the ion enhancement system 2 are provided below. The ion enhancement system 2 should not be interpreted to be limited to just these configurations or embodiments. Other designs and arrangements are possible and the limited embodiments provided here are for illustration purposes only and should not be interpreted as to limit the broad scope of the invention.

The ion transport system 6 is adjacent to the ion enhancement system 2 and may comprise a collection conduit 9 or any ion optics, conduits or devices that may transport analyte ions and that are well known in the art. Other device may include the use of ion guides, multipole ion guides, or other similar type devices that are well known in the art.

Figure 2:
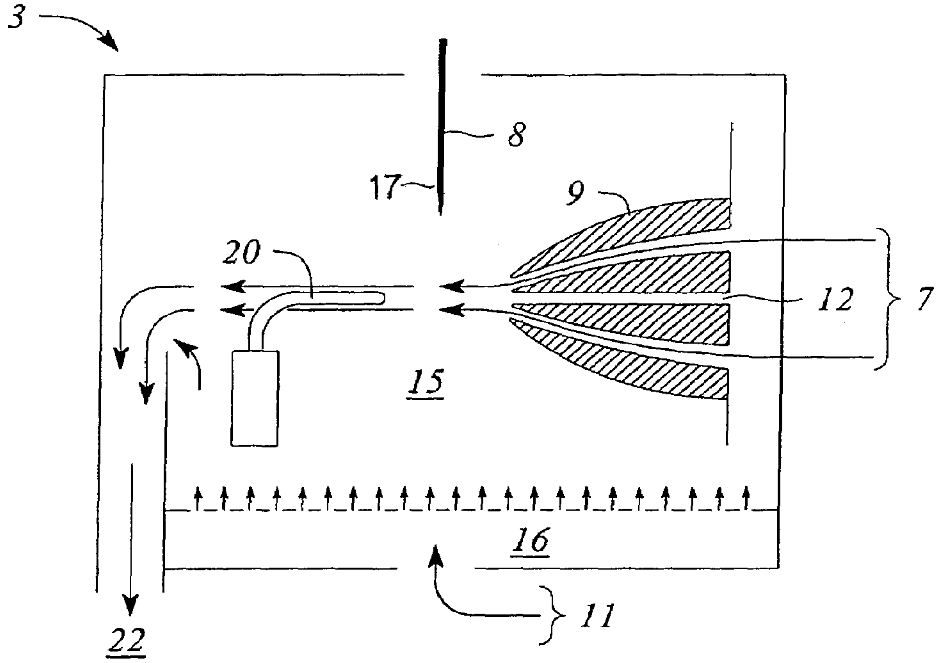
FIG. 2 shows a first embodiment of the present invention.

FIG. 2 shows a first embodiment of the present invention. The figure is not to scale and is used for illustrative purposes. The ion source 3 comprises the ionization device 8 in the form of a nebulizer 17. An optional counter electrode 20 may be employed with the present invention. The counter electrode 20 is often employed to direct ions toward the collection conduit 9. In certain instances and embodiments the counter electrode 20 may comprise a steering electrode. The ionization device 8 may be oriented in any number of arrangements or locations relative to the collection conduit 9. The ionization device 8 is designed to provide ions or spray them into the ionization region 15.

The ionization device 8 may be in the form of any device known in the art for producing or spraying ions. The nebulizer 17 may comprise any number of nebulizers known in the art. The nebulizer 17 may be placed in any number of locations or orientations to maximize the output to the ionization region 15.

The collection conduit 9 is located downstream from the ion source 3 and may comprise a variety of materials and designs that are well known in the art. The collection conduit 9 is designed to receive and collect analyte ions produced from the ionization device 8 that are discharged into the ionization region 15. The collection conduit 9 has an aperture and/or elongated bore 12 that receives the analyte ions and transports them to another conduit or location. The collection conduit 9 may comprise a variety of materials and devices well known in the art. For instance, the collection conduit 9 may comprise a sleeve, transport device, dispenser, nozzle, hose, pipe, pipette, port, connector, tube, coupling, container, housing, structure or apparatus that is used to direct a heated gas or gas flow toward a defined region in space or location such as the ionization region 15. It is important to the invention that the collection conduit 9 be positioned sufficiently close to the ionization region 15 so that a sufficient amount of heated gas can be applied to the ions in the ionization region 15. The heated gas is provided to the ionization region 15 by way of the first gas source 7.

The first gas source 7 is used to provide a heated gas to the ionization region 15. The heated gas provides a way to "enhance" the analyte ion being sprayed or ejected into the ionization region 15. The heat provided to the gas may be regulated in a number of different ways. For instance, the gas may be pre-heated and circulated or may be circulated and then later heated before it enters the ionization region 15. The first gas source 7 may comprise any number of devices to provide heated gas. Gas sources are well known in the art and are described elsewhere. The first gas source 7 may be a separate component or may be integrated with a coupling or other device that operatively joins the first gas source 7 to another device. The first gas source 7 may provide a number of gases that are to be collected by collection conduit 9. For instance, gases such as nitrogen, argon, xenon, carbon dioxide, air, helium etc. may be used with the present invention. The gas need not be inert and should be capable of carrying a sufficient quantum of energy or heat. Other gases well known in the art that contain these characteristic properties may also be used with the present invention. The flow of gas from the first gas source through the ionization region may be collected by an exit port such that the first gas preferentially exits through this port, thereby reducing recirculation of the gas which will have ions present that were not collected by the collection conduit. Important to the invention is the second gas source 11. The second gas source 11 may be located in any number of locations or arrangements within the ion source 3. However, the second gas source 11 provides a gas at a defined and regulated rate to the ionization region 15. The defined and regulated rate of gas flow across the ion source provides for improvement in sensitivity and ion stability during capture by the collection conduit 9. The second gas source 11 may comprise any number of devices to provide gas. Gas sources may comprise conduits, housing, plates, plates with apertures, walls in the chamber, a reservoir or any other similar type device that can provide for a defined and consistent flow rate across the ion source 3. The second gas source 11 may be a separate component or may be integrated with a coupling or other device that operatively joins the second gas source 11 to another device. The second gas source 7 may provide a number of different types of gases to the ion source 3 and/or ionization region 15. The gas provided may be the same or different from the first gas source 7. For instance, gases such as nitrogen, argon, xenon, carbon dioxide, air, helium etc. may be used with the present invention. The gas need not be inert and may be capable of carrying a sufficient quantum of energy or heat. Other gases well known in the art that contain these characteristic properties may also be used with the present invention. It is important to the invention that the gas supplied by the second gas source 11 be in a regulated and continuous fashion. In other words, the gas is provided in a continuous and controlled fashion across the chamber of the ion source 3. It is important to the invention that the structure of the second gas source 11 be capable of providing a continuous and continuously distributed gas to the chamber of the ion source 3. The exit of the second source gas is configured such that recirculation of the second gas is minimized.

The ionization region 15 comprises the space and area located in the area between the ion source 3 and the collection conduit 9. This region contains the ions produced by ionizing the samples that are vaporized into a gas phase. This region can be adjusted in size and shape depending upon how the ion source 3 is arranged relative to the collection conduit 9. Most importantly, located in this region are the analyte ions produced by the ionization device 8.

FIG. 2 also shows the first gas source 7 and the second gas source 11. The first gas source 7 provides a flow of heated gas toward the ions in the ionization region 15. The heated gas interacts with the analyte ions in the ionization region 15 to enhance the analyte ions and allow them to be more easily detected by the detector 11 (not shown in FIG. 2). These ions include the ions that exist in the heated gas phase. The detector 11 is located further downstream in the mass spectrometry system (see FIG. 1).

Molecules generally move from the nebulizer 17 to the entrance of the ion collection conduit 9. Accordingly, for the purposes of this disclosure, an ionization device 8 of the invention may comprise an axis of ion movement defined by the longitudinal axis of the ion collection conduit 9, i.e., the ion collection conduit 9 comprises a longitudinal axis that the ions move along. Further, for the purposes of this disclosure, the axis of heated gas flow is defined by the longitudinal axis of the conduit that provides the heated gas, i.e., a molecular axis that the heated gas moves along.

Figure 3:
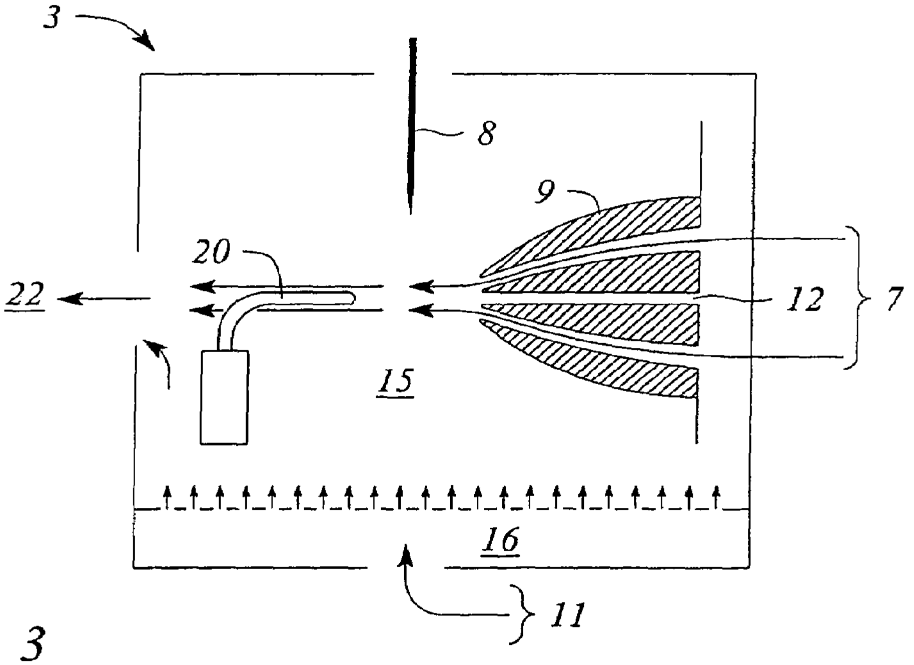
FIG. 3 shows a second embodiment of the present invention.

In certain embodiments and as illustrated in FIGS. 2 and 3, the axis of gas flow from the first gas source 7 may be at any angle from 0° and 360°, including the angles of 0° and 360°, relative to the axis of ion movement from the ionization device 8 to the entrance of the ion collection conduit. For example, the axis of gas flow may be opposing or anti-parallel (i.e. about 180 degrees), parallel (i.e., about 0 degrees) or orthogonal to the axis of ion flow, or any angle there between.

In certain embodiments, the direction of flow of the heated gas is at any angle in the following ranges: of 0-30 degrees, 30-60 degrees, 60-90 degrees, 90-120 degrees, 120-150 degrees, 150-180 degrees, 180-210 degrees, 210-240 degrees, 240-270 degrees, 270-300 degrees, 300-330 degrees, 330-360 degrees with respect to the axis of ion flow. In particular embodiments, the axis heated gas is oriented orthogonally to the axis of ion movement.

The angles listed above may be any angle in two or three dimensional space. In other words, the angle may be in an x/y plane (i.e., in the same plane as FIG. 3), or in a z plane (i.e., the axis of heated gas may be oriented above or below the x/y plane of FIG. 3) or a combination thereof. In other words, viewed from the side (as shown in FIG. 3) or from "above" (e.g., from the entrance of the ion collection capillary) the axis of heated gas may be at any angle relative to the axis of ion transport.

Referring now to FIGS. 1-3, the detector 11 is located downstream from the ion source 3 and the collection conduit 9. The detector 11 may be a mass analyzer or other similar device well known in the art for detecting the enhanced analyte ions that were collected by the collection conduit 9. The detector 11 may also comprise any computer hardware and software that are well known in the art and which may help in detecting enhanced analyte ions.

Having described the apparatus of the present invention, a description of the method of the invention is now in order.

Referring now to FIGS. 1-3 the method of the present invention can now be described. The ionization device 8 provides an initial source of ions to the ionization region 15. These charged droplets are generally in a format that comprises analyte and solvent. Once sprayed or directed into the ionization region 15, the charged droplets can then be desolvated to concentrate them before they enter the collection conduit 9. This may be accomplished by using a first gas source 7 to direct a heated gas into the ionization region 15 to contact and dry the molecules. In addition, the second gas source 11 provides a second gas to the ion source 3 at a steady and defined rate. As shown in the figure, the gas can be directed through a variety of apertures that connect with an outside area 16 of the ion source 3 to the ionization region 15. Once the first gas source 9 heats the analyte and helps to desolvate it, the ions that are not collected by the collection conduit 9 continue to pass though the chamber$_{[RB7]}$ and then out the exhaust port 22. In many current designs the exhaust port 22 is not present or in an effective location to remove contaminants or unwanted materials. As shown in FIG. 2, the exhaust port 22 is placed such that the gas from the first gas source 7 is preferentially and, ideally, completely collected and exhausted from the chamber. An alternate embodiment, shown in FIG. 3, places the exhaust port 22 such that the gas from the first gas source$_{[RB9]}$.

The exhaust port may be configured in a few different arrangements. The first is a separate exhaust that is meant primarily for only the second gas and the second method is an exhaust that serves to put out both the first and second gases at the same time while preventing recirculation of the ions in the chamber. The first method can be accomplished by using a plate similar to that used at the second gas source. The second method can be accomplished by a similar version of the configuration shown in FIG. 2.

It is to be understood that while the invention has been described in conjunction with the specific embodiments thereof, that the foregoing description as well as the examples that follow are intended to illustrate and not limit the scope of the invention. Other aspects, advantages and modifications within the scope of the invention will be apparent to those skilled in the art to which the invention pertains.

All patents, patent applications, and publications infra and supra mentioned herein are hereby incorporated by reference in their entireties.

We claim:

1. An ion source comprising:

(a) an ionization device for producing ions and delivering them to an ionization region;

(b) a collection conduit adjacent to the ionization device for collecting ions produced by the ionization device, the ionization region being positioned between the ionization device and the collection conduit;

(c) a first gas source for supplying gas to the ionization region along a first molecular longitudinal axis to desolvate ions produced by the ionization device; and (d) a second gas source for supplying gas at a defined flow to the ionization region along a second molecular longitudinal axis oriented transversely to the first molecular longitudinal axis.

2. An ion source as recited in claim 1, wherein the ionization device comprises an electrospray device.

3. An ion source as recited in claim 1, wherein the ionization device comprises a MALDI device.

4. An ion source as recited in claim 1, wherein the ionization device comprises an AP-MALDI device.

5. An ion source as recited in claim 1, wherein the second gas source comprises a plate for distributing the gas to the ionization region.

6. An ion source as recited in claim 5, wherein the plate comprises at least one aperture for delivering gas to the ionization region.

7. An ion source as recited in claim 1, wherein the second gas source comprises a conduit.

8. An ion source as recited in claim 1, wherein the second gas source comprises a plurality of conduits.

9. An ion source as recited in claim 1, wherein the second gas source comprises a reservoir having an aperture for delivering a gas.

10. An ion source as recited in claim 1, wherein the first gas source delivers gas in molecular longitudinal axis that is parallel to the collection conduit.

11. An ion source as recited in claim 1, wherein the second gas source comprises a reservoir having a plurality of apertures for delivering a gas.

12. An ion source as recited in claim 1, that further comprises an exhaust port for removing the gas produced from the second gas source.

13. An ion source as recited in claim 1, further comprising an exhaust port for removing the gas produced by the first gas source and the second gas source.

14. A mass spectromety system, comprising:

(a) an ion source comprising:

(i) an ionization device for producing ions and delivering them to an ionization region;

(ii) a collection conduit adjacent to the ionization device for collecting ions produced by the ionization device, the ionization region being positioned between the ionization device and the collection conduit;

(iii) a first gas source for supplying gas in a first stream having a first molecular longitudinal axis to the ionization region to desolvate ions produced by the ionization device; and (iv) a second gas source for supplying gas in a second stream at a defined flow rate to the ionization region, the second stream having a second molecular longitudinal axis oriented transversely to the first molecular longitudinal axis; and (b) a detector downstream from the ion source for detecting ions produced by the ion source.

15. A mass spectrometry system as recited in claim 14, wherein the ionization device comprises an electrospray device.

16. A mass spectrometry system as recited in claim 14, wherein the ionization device comprises a MALDI device.

17. A mass spectrometry system as recited in claim 14, wherein the ionization device comprises an AP-MALDI device.

18. A mass spectrometry system as recited in claim 14, wherein the second gas source comprises a plate for distributing the gas to the ionization region.

19. A mass spectrometry system as recited in claim 18, wherein the plate comprises at least one aperture.

20. A mass spectrometry system as recited in claim 14, wherein the second gas source comprises a conduit.

21. A mass spectrometry system as recited in claim 14, wherein the second gas source comprises a plurality of conduits.

22. A mass spectrometry system as recited in claim 14, wherein the second gas source comprises a reservoir having an aperture for delivering gas.

23. A mass spectrometry system as recited in claim 14, wherein the second gas source comprises a reservoir having a plurality of apertures for delivering gas.

24. A mass spectrometry system as recited in claim 14, wherein the first gas source delivers gas in a stream with a molecular longitudinal axis that is parallel to the collecting conduit.

25. A method of improving a mass spectrometer's sensitivity comprising:

(a) producing analyte ions from an ionization device;

(b) delivering the analyte ions to an ionization region;

(c) directing a first heated gas in a first stream having a first molecular longitudinal axis to the ionization region to desolvate the analyte ions; and (d) directing a second gas in a second stream to the ionization region at a defined and continual flow rate to improve the mass spectrometer's sensitivity, the second stream having a second molecular longitudinal axis oriented transversely to the first molecular longitudinal axis.

* * * * *

UNITED STATES PATENT AND TRADEMARK OFFICE

CERTIFICATE OF CORRECTION

PATENT NO. : 7,397,028 B2
APPLICATION NO. : 11/216884
DATED : July 8, 2008
INVENTOR(S) : Brennen et al.

It is certified that error appears in the above-identified patent and that said Letters Patent is hereby corrected as shown below:

In column 8, line 27, in Claim 14, delete “spectrometly” and insert -- spectrometry --, therefor.

Signed and Sealed this

Twenty-first Day of October, 2008

JON W. DUDAS
*Director of the United States Patent and Trademark Office*